United States Patent

Nagy

[11] 3,907,469
[45] Sept. 23, 1975

[54] OIL SEAL ARRANGEMENT FOR A ROTARY MACHINE

[75] Inventor: Laszlo Nagy, St. Clair Shores, Mich.

[73] Assignee: General Motors Corporation, Detroit, Mich.

[22] Filed: Mar. 15, 1974

[21] Appl. No.: 451,486

[52] U.S. Cl. ............................................. 418/142
[51] Int. Cl.² ......................................... F01C 19/08
[58] Field of Search ............ 418/142; 277/205, 206

[56] References Cited
UNITED STATES PATENTS

| | | | |
|---|---|---|---|
| 3,180,563 | 4/1965 | Jones | 418/142 |
| 3,189,359 | 6/1965 | Haberkorn | 277/205 |
| 3,506,275 | 4/1970 | Moriyama | 418/142 |
| 3,718,412 | 2/1973 | McCormick | 418/142 |
| 3,802,812 | 4/1974 | Ruf | 418/142 |
| 3,827,838 | 8/1974 | Prasse | 418/142 |

Primary Examiner—William L. Freeh
Assistant Examiner—O. T. Sessions
Attorney, Agent, or Firm—Ronald L. Phillips

[57] ABSTRACT

An oil seal arrangement for a rotary machine comprising an elastomeric sealing ring having a load carrier portion that continuously elastically supports an oil scraper ring on the machine's rotor and also having a lip that continuously sealingly contacts the rotor.

4 Claims, 5 Drawing Figures

US Patent  Sept. 23,1975  3,907,469

OIL SEAL ARRANGEMENT FOR A ROTARY MACHINE

This invention relates to an oil seal arrangement for a rotary machine and more particularly to such an arrangement having an elastic sealing ring with a load carrier portion for elastic support and a lip for sealing.

It is common practice in presently commercial rotary combustion engines to have one or more oil scraper seals mounted on each side of the rotor with an O-ring mounted between each oil scraper seal and the rotor to prevent leakage therebetween of either blow-by gas or oil. The O-ring to a limited extent also provides elastic support of the oil scraper seal on the rotor though this function to date has generally been considered as a secondary function, the primary function being one of sealing. It has been found, however, that vibrations of the oil scraper seal can produce leakage paths which the conventional O-ring is not designed to accommodate.

According to the present invention there is provided an elastomeric sealing ring in lieu of the conventional O-ring which has a load carrier portion that is effective to provide continuous elastic support of the oil scraper seal on the rotor against all exciting forces normally encountered in engine operation and which, in addition, has a continuous annular lip which maintains sealing contact with the rotor in all relative positions of the oil scraper seal relative to the rotor.

An object of the present invention is to provide a new and improved oil seal arrangement for a rotary machine.

Another object is to provide in an oil seal arrangement for a rotary machine an elastic sealing ring having a load carrier portion that continuously elastically supports an oil scraper seal on the rotor and, in addition, having a lip that provides continuous sealing contact with the rotor.

Another object is to provide in an oil seal arrangement for a rotary combustion engine an elastomeric sealing ring mounted on an oil scraper seal that mounts on the machine rotor wherein the sealing ring has a load carrier portion that provides continuous elastic support of the seal on the rotor and also has an integral lip that continuously sealingly contacts the rotor and wherein the lip has a spring rate substantially less than that of the load carrier portion and a radial deflection on installation that is substantially greater than that of the load carrier portion.

These and other objects of the present invention will be more apparent with reference to the following description and drawing in which.

Figure 1:
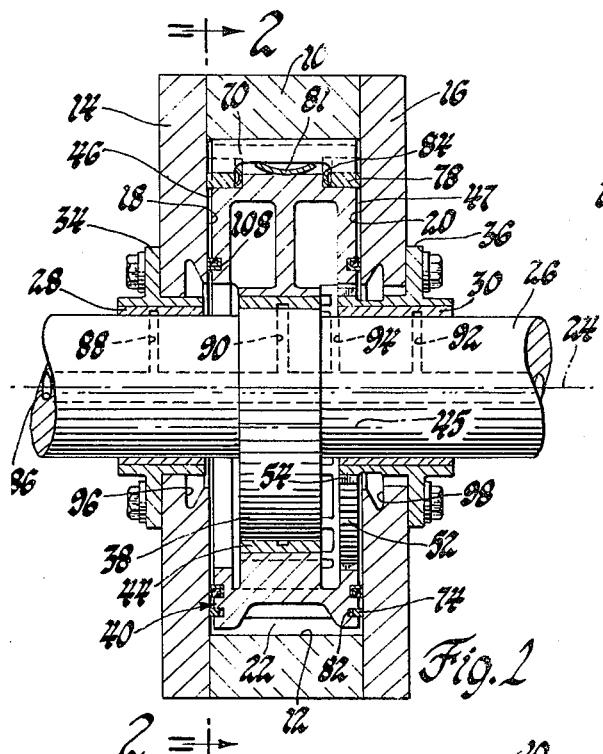
FIG. 1 is a longitudinal sectional view of a rotary combustion engine having an oil seal arrangement according to the present invention.
Figure 2:
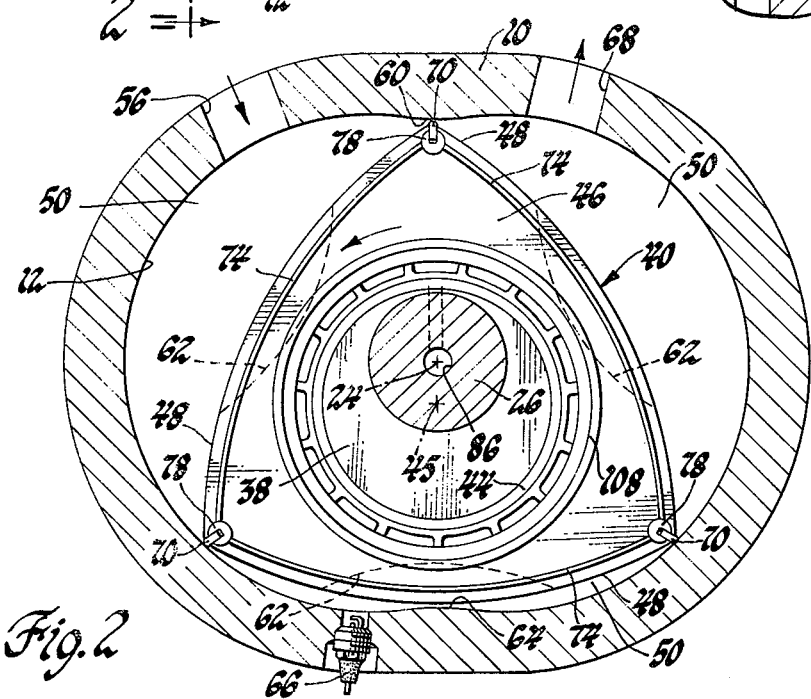
FIG. 2 is a transverse view of the rotary machine taken along the line 2—2 in FIG. 1.

The oil seal arrangement according to the present invention is useful in rotary machines including rotary combustion engines, compressors,pumps, and the like, as is demonstrated by its use in an internal combustion rotary engine of the presently commercial type shown in FIGS. 1 and 2. This type engine generally comprises a rotor housing 10 having an inwardly facing inner peripheral wall 12 and a pair of end housings 14 and 16 having parallel, oppositely facing, inner end walls 18 and 20, respectively. The housing parts are rigidly secured together by bolts, not shown, and the inner housing walls 12, 18 and 20 cooperatively provide a cavity 22. Referring to FIG. 2, the peripheral wall 12 is a two-lobe curve with a center line indicated at 24. A crankshaft 26 extends through the cavity 22 and is rotatably supported in sleeve bearings 28 and 30 which are secured in collars 34 and 36 that are bolted to the end housings 14 and 16, respectively, as shown in FIG. 1, the crankshaft axis being coincident with the center line 24, parallel to the peripheral wall 12 and perpendicular to the end walls 18 and 20. The crankshaft 26 is provided in the cavity 22 with an eccentric 38. A three-lobe rotor 40 has a hub with a sleeve bearing 44 journaled on the eccentric 38 whereby the rotor 40 is supported for rotation about the eccentric's center line 45 which is thus the rotor's axis. The rotor 40 has sides 46 and 47 which face the respective end walls 18 and 20 and is provided with the general shape of a triangle with three radially outwardly facing convex peripheral flanks or faces 48 which face the peripheral wall 12 and cooperate therewith and also with the end walls 18 and 20 to define three variable volume working chambers 50 that are spaced around the rotor and move with the rotor within the housing as the rotor rotates about its axis 45 while planetating with respect to the crankshaft axis 24.

With the two-lobe peripheral wall 12 and the three-lobe rotor 40, each of the working chambers 50 sequentially expands and contracts between minimum and maximum volume during each rotor revolution in fixed relation to the housing by forcing the rotor 40 to rotate at one-third the speed of the crankshaft 26. This is accomplished by gearing comprising an internal tooth gear 52 which is concentric and integral with the rotor 40. The gear 52 meshes with an external tooth gear 54 which is received with clearance about and is concentric with the crankshaft 26 and is made stationary by being formed integral with the right-hand collar 36 as shown in FIG. 1. The gear 52 has one and one-half times the number of teeth as the gear 54 to provide the required speed ratio of 3:1 between the crankshaft 26 and the rotor 40.

A combustible air-fuel mixture from a suitable carburetor arrangement, not shown, is made available to each working chamber 50 by an intake passage 56 as shown in FIG. 2 which extends through the rotor housing 10 and opens to the cavity through the peripheral wall 12 on the leading side of cusp 60 of this wall relative to the direction of rotor rotation indicated by the arrow in FIG. 2. A single channel or recess 62 is provided in the center of each chamber face 48 of the rotor 40 to provide for the transfer of working gases past the peripheral wall's other cusp 64 when a rotor face is at or near its top-dead-center position, as shown in FIG. 2, so that the chambers are not divided by the cusp 64 at the time when combustion is to occur therein. A spark plug 66 is mounted in the rotor housing 10 adjacent the cusp 64 with its electrodes exposed to the working chambers. As the rotor 40 planetates, the working chambers successively draw in fuel mixture as the rotor faces pass the intake passage. The fuel mixture is then trapped in each working chamber and compressed and when the rotor face of this chamber is in the vicinity of top-dead-center, this mixture is ignited at the completion of the compression phase; there being provided a suitable ignition system, not shown, for applying voltage to plug 66 at the proper time. Upon ignition of the mixture in each working chamber the peripheral wall 12 takes the reaction forcing the rotor 40 to continue its motion while the gas is expanding. The leading rotor apex of each working chamber eventually traverses an exhaust passage 68 on the trailing side of cusp 60 whereby the exhaust products are then expelled through this exhaust passage to complete the cycle.

Sealing of the chambers 50 for such four-cycle operation is provided by three apex seals 70 which are each mounted in an axially extending radially outwardly facing groove that is located at each apex or corner of the rotor 40 and extends the width thereof. Three arcuate side seals 74 are mounted in axially outwardly facing grooves in each rotor side and extend adjacent the rotor faces between two apex seals 70. Three cylindrical corner seals 78 are mounted in cylindrical holes in each rotor side with each corner seal providing sealing between the adjacent ends of two side seals and one apex seal as shown in FIG. 2. Referring to FIG. 1, each of the apex seals 70 is biased by a spring 81 to continuously engage the peripheral wall 12 and each of the side seals 74 and corner seals 78 is biased to continuously engage the respective end walls 18 and 20 by a wave spring 82 and a C-shaped spring 84, respectively.

Describing now the lubrication and rotor cooling that is normally provided in such an arrangement, oil from the engine drains to a sump from which it is delivered by a suitable engine powered pump to an axial oil passage 86 in the crankshaft 26 as shown in FIG. 1. Radial oil passages 88, 90 and 92 deliver oil from the passage 86 to lubricate the sleeve bearings 28, 44 and 30, respectively. The rotor 40 is hollow and is webbed for rigidity and a radial oil passage 94 in the crankshaft 26 delivers oil from the passage 86 to the rotor's interior for cooling of the rotor with the oil carrying the heat from the rotor by passing to annular cavities 96 and 98 in the respective end walls 18 and 20 that are connected to drain to the sump.

Figure 3:
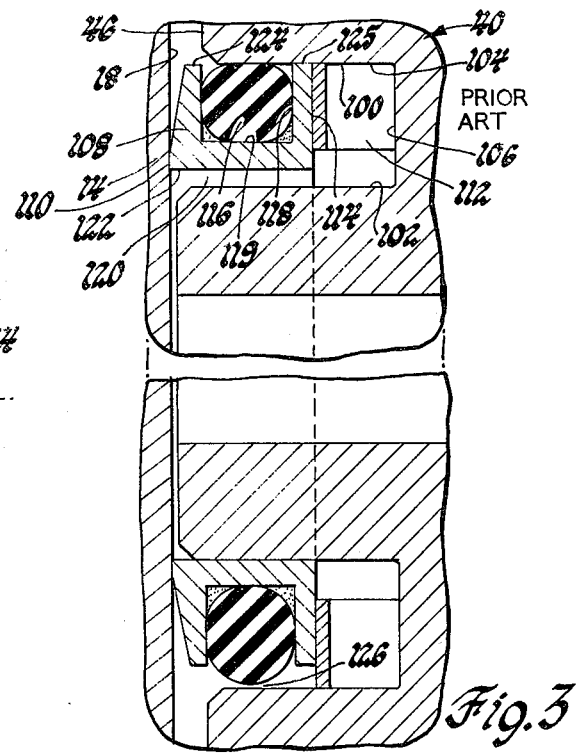
FIG. 3 is an enlarged sectional view of a conventional oil seal arrangement.

In this type of engine structure there is generally provided one or more annular oil seal arrangements between the rotor sides 46 and 47 and the respective adjacent end walls 18 and 20 to prevent the oil supplied for lubrication and cooling from reaching radially outward to the rotor's gas seals and eventually the working chambers. One presently commercial type oil seal arrangement is shown in FIG. 3 in the left-hand rotor side 46. In this prior art arrangement there is a circular groove 100 in each of the rotor sides which is located concentric with the rotor 40 radially inward of the side seals 74 and corner seals 78 and faces the closely adjacent end wall of the engine housing. The groove 100 which is rectangular in cross-section has axially extending radially outwardly and inwardly facing sides 102 and 104 and an axially facing radially extending flat bottom 106. A circular oil scraper seal 108 of suitable metal is mounted in the oil seal groove 100 and is biased axially outward so that its scraper edge 110 on its outboard side scrapes against the end wall 18. This sealing force is provided by a circular wave spring 112 that fits in the oil seal groove 100 between bottom 106 and the inboard side 114 of oil scraper seal 108. In addition, there is provided sealing between oil scraper seal 108 and rotor 40 by an elastomeric O-ring 116 which is mounted in a radially facing groove 118 in the oil scraper seal 108 and is squeezed between this groove's bottom 119 and the oppositely radially facing side of the oil scraper seal groove 100. It is also known to provide additional bias on the oil scraper seal 108 according to the pressure of the fluid being sealed by employing the pressure of such fluid to assist the spring bias. Furthermore, it is also known to provide a combination of two oil scraper seals with these different fluid pressure biases. For example, in the oil seal arrangement shown in FIG. 3, the O-ring 116 is squeezed between the oil scraper seal 108 and the radially inwardly facing side 104 of groove 100 while oil internal of the oil scraper seal is permitted to pass through radial clearance 120 on the radially inwardly facing side 122 of the oil scraper seal to the backside 114 of the oil scraper seal where oil pressure is then developed by centrifugal force to assist the spring bias. Alternatively, the O-ring and its groove may be provided on the radially inwardly facing side of the oil scraper seal. Thirdly, there is presently commercially used a pair of concentric oil seal arrangements of this type wherein the radially inwardly located oil scraper seal has the O-ring on its radially outwardly facing side and the radially outwardly located oil scraper seal has the O-ring on its radially inwardly facing side.

It has been found that in such conventional seal arrangements, there is produced a radial force on the oil scraper seal 108 as it is carried along by the rotor against the housing end wall whose magnitude is equal to or approximates the sum of the momentary seal-to-housing end wall friction force which is generated by the spring load and whatever fluid pressure exists, the centrifugal force on the seal and an impact force on the seal. This latter force has been found to occur when the rotor tilts because of manufacturing tolerances and the like such that the seal contacts the groove side 104 on the seal's radially outwardly facing side 124 at the point 125. In that event and while the rotor continues to planetate, an axial component of the radial force is placed on the seal at this seal-to-groove contact point. These exciting forces are then transmitted by the metal-to-metal contact to the seal which is then not elastically supported by the O-ring and can cause substantial seal vibration with their axial components tending to lift the seal away from the housing end wall it is intended to scrape. While these forces or movements may be found to be relatively small, they can be very important to satisfactory sealing operation. In an extreme condition such as illustrated in FIG. 3, when the half circle of the O-ring 116 is squeezed sufficiently by the rotor, it decreases the initial amount of radial squeeze on the other half such that there results a potential leak path 126 at this latter location. To prevent such a potential leak path, it is common practice to control the clearances between the oil scraper seal and the sides of the groove in which it fits by metal-to-metal contact between the seal and rotor to thereby limit any decrease in the initial amount of squeeze on the O-ring completely therearound. However, as earlier pointed out, such metal-to-metal contact while controlling squeeze can cause vibration problems since the seal is then not elastically supported.

Figure 4:
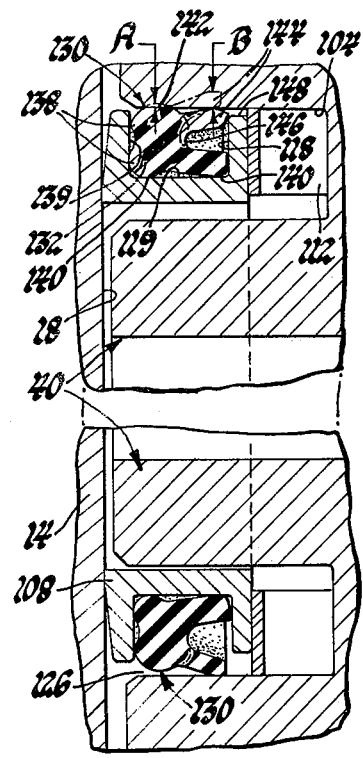
FIG. 4 is an enlarged sectional view of the oil seal arrangement according to the present invention.
Figure 5:
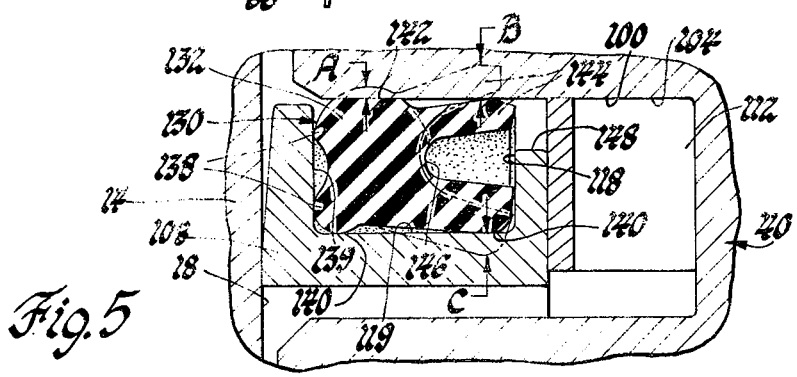
FIG. 5 is an enlarged illustration of the squeeze of the oil seal arrangement according to the present invention.

The oil seal arrangement according to the present invention eliminates such problems and is shown in FIG. 4 and also in FIG. 5 in a modified form with parts similar to those shown in FIG. 3 designated by the same numerals and new and different parts and newly referred to parts designated by new numerals. As shown in FIG. 4, there is provided in place of the conventional O-ring, a sealing ring 130 of elastomeric material mounted in the sealing ring groove 118 of the oil scraper seal 108. The sealing ring 130 has a continuous main load carrier portion 132 which as its main purpose acts to continuously elastically support the oil scraper seal 108 on the rotor. The load carrier portion 132 has a plurality of continuous annular surfaces which contact the oil scraper seal 108 in the groove 118 on all three sides for radial and axial location, these surfaces including a spaced pair of sealing surfaces 138 on the outboard side which contact the outboard side 139 of the sealing groove 118 and a spaced pair of sealing surfaces 140 on the radially inwardly facing side which contact the groove bottom 119. The load carrier portion 132 at its radially outwardly facing side 142 is a continuous surface and contacts the oil scraper seal groove side 104. The unloaded (as formed) radial thickness and spring rate of the load carrier portion 132 are determined to provide elastic support of the oil scraper ring 108 under all normally encountered exciting forces so that no oil scraper seal-to-rotor contact can occur. The radial squeeze A of the load carrier portion 132 is not intended to provide for sealing contact with the rotor as compared with the conventional O-ring, the latter requiring a substantially higher spring rate to maintain sealing while preventing oil scraper seal-to-rotor contact and thus being burdened with a stiffer elastic support and more drag which are both undesirable. Sealing is instead provided by a circular lip 144 which depends in both an axial and radial direction from the inboard side 146 of the load carrier portion 132 to engage the same radially facing side 104 of the oil scraper seal groove 100 contacted by the load carrier portion side 142. The lip 144 as formed projects substantially radially past the load carrier side 142 and thus on installation and under all operating conditions has a radial squeeze B substantially greater than the radial squeeze A of the load carrier section as shown in FIGS. 4 and 5. However, the lip 144 is thin and very flexible compared to the load carrier portion 132 and thus has a substantially lower spring rate so that while the load carrier portion provides a continuous elastic support for the oil scraper seal, the lip 144 because of its greater flexibility is readily able to provide and maintain sealing contact with the rotor in any position of the oil scraper seal. This is demonstrated in FIG. 4 wherein with the highest exciting force the load carrier portion 132 may lose contact with the rotor but the lip 144 because of its greater radial squeeze dimension flexes farther outward to maintain sealing at this location. Oil scraper seal-to-rotor contact can be further avoided by reducing the height of the inboard wall of the sealing ring groove 118 to a lower radius 148 as shown in FIG. 5 to positively avoid metal-to-metal contact in a very severe rotor tilt condition while the lip 144 because of its larger initial radial squeeze remains able to retain sealing and the load carrier portion maintains the elastic support. Furthermore, the inboard located radially inwardly facing sealing surface 140 of the load carrier portion 132 may also be formed to project radially inwardly past its companion sealing surface which is outboard thereof so that it is deflected with a radial squeeze C on installation and assists sealing between the sealing ring 130 and the oil scraper ring 108 as shown in FIG. 5.

Thus, the oil scraper seal is no longer subjected to exciting forces by virtue of the load carrier portion which provides only an elastic support for this seal by directly opposing these forces and with a minimum amount of drag while the lip provides and maintains sealing contact with the rotor with minimum drag. Furthermore, less axial spring load on the oil scraper seal is now required because of less drag by the load carrier portion and the sealing lip which can result in less end housing and oil scraper seal wear. It will also be appreciated that while the invention has been demonstrated for use on the radially outwardly facing side of the oil scraper seal, it is equally applicable to use on the opposite side thereof.

The above described embodiments are illustrative of the invention which may be modified within the scope of the appended claims.

I claim:

1. An oil seal arrangement for a rotary machine having a housing with a pair of interior oppositely facing end walls and an interior peripheral wall defining a cavity and a rotor mounted for planetary movement in said cavity with sides opposite said end walls, said oil seal arrangement comprising an annular oil seal groove in each side of said rotor, an annular oil scraper seal mounted in each said oil seal groove for scraping the opposite end wall while said rotor planetates, a spring mounted in each said oil seal groove for biasing the oil scraper seal axially outward against the opposite end wall, a radially facing sealing ring groove in each said oil scraper seal, elastomeric sealing ring means mounted in each said sealing ring groove, each said elastomeric sealing ring means having a main load carrier portion radially squeezed between said oil scraper seal and said rotor, each said elastomeric sealing ring means further having a continuous annular lip depending in both an axial and radial direction from said load carrier portion to engage said rotor and be deflected thereby and said lip having a radial deflection on installation substantially greater than the radial squeeze of said load carrier portion but a spring rate substantially less than that of said load carrier portion so that said load carrier portion provides a continuous elastic support for said oil scraper seal in all relative positions thereof without direct contact between said oil scraper seal and said rotor while said lip flexes sufficiently to maintain sealing contact in all relative positions of said oil scraper seal.

2. An oil seal arrangement for a rotary machine having a housing with a pair of interior oppositely facing end walls and an interior peripheral wall defining a cavity and a rotor mounted for planetary movement in said cavity with sides opposite said end walls, said oil seal arrangement comprising an annular oil seal groove in each side of said rotor having an axially facing bottom and a pair of oppositely radially facing sides, an annular oil scraper seal mounted in each said oil seal groove having a pair of oppositely radially facing sides facing the associated radially facing sides of the oil seal groove and an inboard side facing the bottom of the oil seal groove and an outboard side for scraping the opposite end wall while said rotor planetates, a spring mounted in each said oil seal groove between the bottom thereof and the backside of the associated oil scraper seal for biasing the oil scraper seal axially outward against the opposite end wall, a radially facing sealing ring groove in one of the radially facing sides of each said oil scraper seal having oppositely axially facing outboard and inboard sides and a radially facing bottom, elastomeric sealing ring means mounted in each said sealing ring groove, each said elastomeric sealing ring means having a continuous annular main load carrier portion with radially oppositely facing sides contacting the bottom of the sealing ring groove and the radially oppositely facing side of the oil scraper seal groove, each said elastomeric sealing ring means further having a continuous annular lip depending in both an axial and radial direction from said load carrier portion to engage the same radially facing side of said oil scraper seal groove contacted by said load carrier portion, and said load carrier portion having a radial deformation on installation substantially less than that of said lip but a spring rate substantially greater than that of said lip so that said load carrier portion provides a continuous elastic support for said oil scraper seal in all relative positions thereof while said lip flexes sufficiently to maintain sealing contact in all relative positions of said oil scraper seal.

3. An oil seal arrangement for a rotary machine having a housing with a pair of interior oppositely facing end walls and an interior peripheral wall defining a cavity and a rotor mounted for planetary movement in said cavity with sides opposite said end walls, said oil seal arrangement comprising a circular oil seal groove in each side of said rotor having an axially facing bottom and a pair of oppositely radially facing sides, a circular oil scraper seal mounted in each said oil seal groove having a pair of oppositely radially facing sides facing the associated radially facing sides of the oil seal groove and an inboard side facing the bottom of the oil seal groove and an outboard side for scraping the opposite end wall while said rotor planetates, a spring mounted in each said oil seal groove between the bottom thereof and the backside of the associated oil scraper seal for biasing the oil scraper seal axially outward against the opposite end wall, a radially facing circular sealing ring groove in one of the radially facing sides of each said oil scraper seal having oppositely axially facing outboard and inboard sides and a radially facing bottom, elastomeric sealing ring means mounted in each said sealing ring groove, each said elastomeric sealing ring means having a continuous circular main load carrier portion with radially oppositely facing sides contacting the bottom of the sealing ring groove and the radially oppositely facing side of the oil scraper seal groove, each said elastomeric sealing ring means further having a continuous circular lip with a spring rate substantially less than that of said load carrier portion, said lip depending in both an axial and radial direction from said load carrier portion to engage the same radially facing side of said oil scraper seal groove contacted by said load carrier portion, and said lip as formed extending substantially radially past said load carrier portion so as to have a radial deflection on installation substantially greater than the radial squeeze of said load carrier portion so that said load carrier portion provides a continuous elastic support for said oil scraper seal in all relative positions thereof while said lip flexes sufficiently to maintain sealing contact in all relative positions of said oil scraper seal.

4. An oil seal arrangement for a rotary machine having a housing with a pair of interior oppositely facing end walls and an interior peripheral wall defining a cavity and a rotor mounted for planetary movement in said cavity with sides opposite said end walls, said oil seal arrangement comprising a circular oil seal groove in each side of said rotor having an axially facing bottom and a pair of oppositely radially facing sides, a circular oil scraper seal mounted in each said oil seal groove having a pair of oppositely radially facing sides facing the associated radially facing sides of the oil seal groove and an inboard side facing the bottom of the oil seal groove and an outboard side for scraping the opposite end wall while said rotor planetates, a spring mounted in each said oil seal groove between the bottom thereof and the backside of the associated oil scraper seal for biasing the oil scraper seal axially outward against the opposite end wall, a radially facing circular sealing ring groove in one of the radially facing sides of each said oil scraper seal having oppositely axially facing outboard and inboard sides and a radially facing bottom, elastomeric sealing ring means mounted in each said sealing ring groove, each said elastomeric sealing ring means having a continuous circular main load carrier portion with radially oppositely facing sides contacting the bottom of the sealing ring groove and the radially oppositely facing side of the oil scraper seal groove and also having an outboard side contacting the outboard side of the sealing ring groove and an inboard side contacting the inboard side of the sealing ring groove, each said elastomeric sealing ring means further having a continuous circular lip depending in both an axial and radial direction from the inboard side of said load carrier portion to engage the same radially facing side of said oil scraper seal groove contacted by said load carrier portion, and said lip having a radial deformation on installation substantially greater than that of said load carrier portion but a spring rate substantially less than that of said load carrier portion so that said load carrier portion provides a continuous elastic support for said oil scraper seal with minimum drag in all relative positions thereof while said lip flexes sufficiently to maintain sealing contact with minimum drag in all relative positions of said oil scraper seal.

* * * * *